US011369938B2

(12) United States Patent
Jami et al.

(10) Patent No.: US 11,369,938 B2
(45) Date of Patent: Jun. 28, 2022

(54) FLOW REACTOR FOR PHOTOCHEMICAL REACTIONS

(71) Applicant: CORNING INCORPORATED, Corning, NY (US)

(72) Inventors: Fouad El Jami, Romainville (FR); Sylvain Maxime F Gremetz, Montereau Fault Yonne (FR); Clemens Rudolf Horn, Milly la Foret (FR); Olivier Lobet, Villiers sous Grez (FR); Alexis Maury, Chateau (FR)

(73) Assignee: Corning Incorporated, Corning, NY (US)

(*) Notice: Subject to any disclaimer, the term of this patent is extended or adjusted under 35 U.S.C. 154(b) by 48 days.

(21) Appl. No.: 16/491,041

(22) PCT Filed: Mar. 5, 2018

(86) PCT No.: PCT/US2018/020882
§ 371 (c)(1),
(2) Date: Sep. 4, 2019

(87) PCT Pub. No.: WO2018/165006
PCT Pub. Date: Sep. 13, 2018

(65) Prior Publication Data
US 2020/0016568 A1    Jan. 16, 2020

Related U.S. Application Data

(60) Provisional application No. 62/467,243, filed on Mar. 5, 2017.

(51) Int. Cl.
*B01J 19/12* (2006.01)

(52) U.S. Cl.
CPC .......... *B01J 19/123* (2013.01); *B01J 19/127* (2013.01); *B01J 2219/1203* (2013.01); *B01J 2219/2456* (2013.01)

(58) Field of Classification Search
CPC .................. B01J 19/123; B01J 19/127; B01J 2219/1203; B01J 2219/2456; B01J 19/12;
(Continued)

(56) References Cited

U.S. PATENT DOCUMENTS

| 6,717,161 B1 * | 4/2004 | Cekic ........................ A61L 2/08 |
|  |  | 250/365 |
| 8,673,157 B2 | 3/2014 | Kolios et al. |

(Continued)

FOREIGN PATENT DOCUMENTS

| CA | 2779814 A1 | 5/2011 |
| CN | 1845786 A | 10/2006 |

(Continued)

OTHER PUBLICATIONS

International Search Report and Written Opinion of the International Searching Authority; PCT/US2018/020882; dated Jun. 13, 2018; 11 Pages; European Patent Office.
(Continued)

*Primary Examiner* — Xiuyu Tai

(57) ABSTRACT

A flow reactor has a fluidic module with a first major outer surface. The module contains a fluid passage and has a transmittance through the first major outer surface to the fluid passage of at least 20% over a range of wavelengths. The reactor has an illumination module comprising one or more radiation sources, which can emit within the range, positioned within an enclosure. The enclosure has a back wall and a side wall and an opening opposite the back wall. An edge of the side wall surrounds the opening. The illumination module is positioned such that the opening of the illumination module faces the first major outer surface of the fluidic module. The side wall comprises a telescoping portion such that a distance from the back wall of the enclosure to the edge of the side wall is adjustable.

18 Claims, 4 Drawing Sheets

(58) Field of Classification Search
CPC ............ B01J 19/2485; B01J 2219/0892; B01J 2219/0871; B01J 19/249; B01J 2219/0877; B01J 2219/0888; B01J 2219/1206; B01J 2219/2453; B01J 2219/2458; B01J 19/126; B01J 2219/0879; B01J 2219/1257; B01J 2219/1266; B01J 19/0093; B01J 2219/00873; B01J 2219/00783; B01J 2219/00889; B01J 2219/00788; B01J 2219/00943; B01J 37/0009; B01J 35/004; B01J 21/063; B01J 2219/0875; A61L 2/08; A61L 2/10; F26B 3/28; F26B 15/12; H05B 3/0066; B01F 13/0001; B01F 13/0066; B01F 13/001; B01F 5/0602; F28F 3/12; B01D 53/885; B01D 2255/20707; B01D 2255/802; C02F 1/725; C02F 1/76; C02F 1/325; C02F 2201/3228; C02F 1/74; C02F 2103/003; C02F 1/78; C02F 1/722; C02F 2201/3223; C02F 2103/36; C02F 2103/32; C02F 2103/28; C02F 2103/365
See application file for complete search history.

(56) References Cited

U.S. PATENT DOCUMENTS

| | | | |
|---|---|---|---|
| 9,150,535 | B2 | 10/2015 | Seeberger et al. |
| 9,370,760 | B2 | 6/2016 | Asano et al. |
| 10,124,313 | B2 | 11/2018 | Gremetz et al. |
| 10,399,058 | B2 | 9/2019 | Lavric |
| 2007/0009403 | A1 | 1/2007 | Ehrfeld et al. |
| 2017/0173553 | A1* | 6/2017 | Gremetz ............... B01J 19/249 |

FOREIGN PATENT DOCUMENTS

| | | |
|---|---|---|
| CN | 201316187 Y | 9/2009 |
| CN | 101709264 A | 5/2010 |
| CN | 101903328 A | 12/2010 |
| CN | 103328440 A | 9/2013 |
| CN | 104144745 A | 11/2014 |
| CN | 104711163 A | 6/2015 |
| CN | 205850821 U | 1/2017 |
| CN | 106457197 A | 2/2017 |
| CN | 107224950 A | 10/2017 |
| CN | 208813267 U | 5/2019 |
| CN | 110252224 A | 9/2019 |
| DE | 10341500 A1 | 3/2005 |
| EP | 2923754 A1 | 9/2015 |
| WO | 2011/032900 A2 | 3/2011 |
| WO | 2013/030247 A1 | 3/2013 |
| WO | WO 2015/148279 * | 10/2015 |
| WO | 2016/201221 A1 | 12/2016 |

OTHER PUBLICATIONS

Shen et al; "Continuous Flow Photocatalysis Enhanced Using an Aluminum Mirror: Rapid and Selective Synthesis of 2'-Deoxy and 2',3'-Dideoxynucleosides"; Chem. Commun., 2012, 48, pp. 7444-7446.

Chinese Patent Application No. 201880016759.5, Office Action dated Apr. 6, 2021, 14 pages (5 pages of English Translation and 9 pages of Original Document), Chinese Patent Office.

Chinese Patent Application No. 201880016759.5, Office Action dated Sep. 9, 2021, 9 pages (4 pages of English Translation and 5 pages of Original Document), Chinese Patent Office.

* cited by examiner

FLOW REACTOR FOR PHOTOCHEMICAL REACTIONS

CROSS-REFERENCE TO RELATED APPLICATIONS

This application claims the benefit of priority under 35 U.S.C. § 371 of International Application No. PCT/US2018/020882, filed on Mar. 5, 2018, which claims the benefit of priority to U.S. Provisional Application No. 62/467,243 filed on Mar. 5, 2017, the content of which are relied upon and incorporated herein by reference in their entirety.

FIELD

The present disclosure relates to flow reactors and flow processes performed therewith, in particular to a modular, flexible, high-throughput and high-efficiency photochemical flow reactor system.

SUMMARY

According to one aspect of the present invention, a flow reactor comprises at least a first fluidic module (20a), the first fluidic module (20a) having a planar form with first and second major outer surfaces (22a, 24a) of essentially planar form, on opposite sides of the module, the first and second major outer surfaces (22a, 24a) surrounded and connected by an edge surface (26a) of the module and separated by a thickness (t) of the module, the first fluidic module (20a) having therein one or more fluid passages (28a) for flowing a process fluid, the first fluidic module having a transmittance through the first major outer surface (22a) to at least one of the one or more fluid passages (28a) of at least 20% over a range of wavelengths; at least a first illumination module (40a), the first illumination module (40a) comprising one or more radiation sources (42a) which emit, at least in part, within the range of wavelengths, positioned within an enclosure (44a), the enclosure (44a) comprising a back wall (46a) and a side wall (48a) extending from the back wall (46a) of the enclosure (44a) in a direction non-parallel to the back wall (46a) of the enclosure, the enclosure (44a) having an opening (50a) opposite the back wall (46a), an edge (52a) of the side wall (48a) opposite the back wall (46a) surrounding the opening (50a), the edge (52a) lying essentially in a single plane, the first illumination module (40a) positioned such that the opening (50a) of the first illumination module (40a) faces the first major outer surface (22a) of the first fluidic module (20a); wherein the side wall (48a) of the first illumination module (40a) comprises a telescoping portion (49a) such that a distance (D1) from the back wall (46a) of the enclosure (44a) to the single plane of the edge (52a) of the side wall (48a) surrounding the opening (50a) is adjustable.

Other variations and specific advantages are discussed or will be apparent from the description below. The foregoing general description and the following detailed description represent specific embodiments, and are intended to provide an overview or framework for understanding the nature and character of the claims.

DETAILED DESCRIPTION

Figure 1:
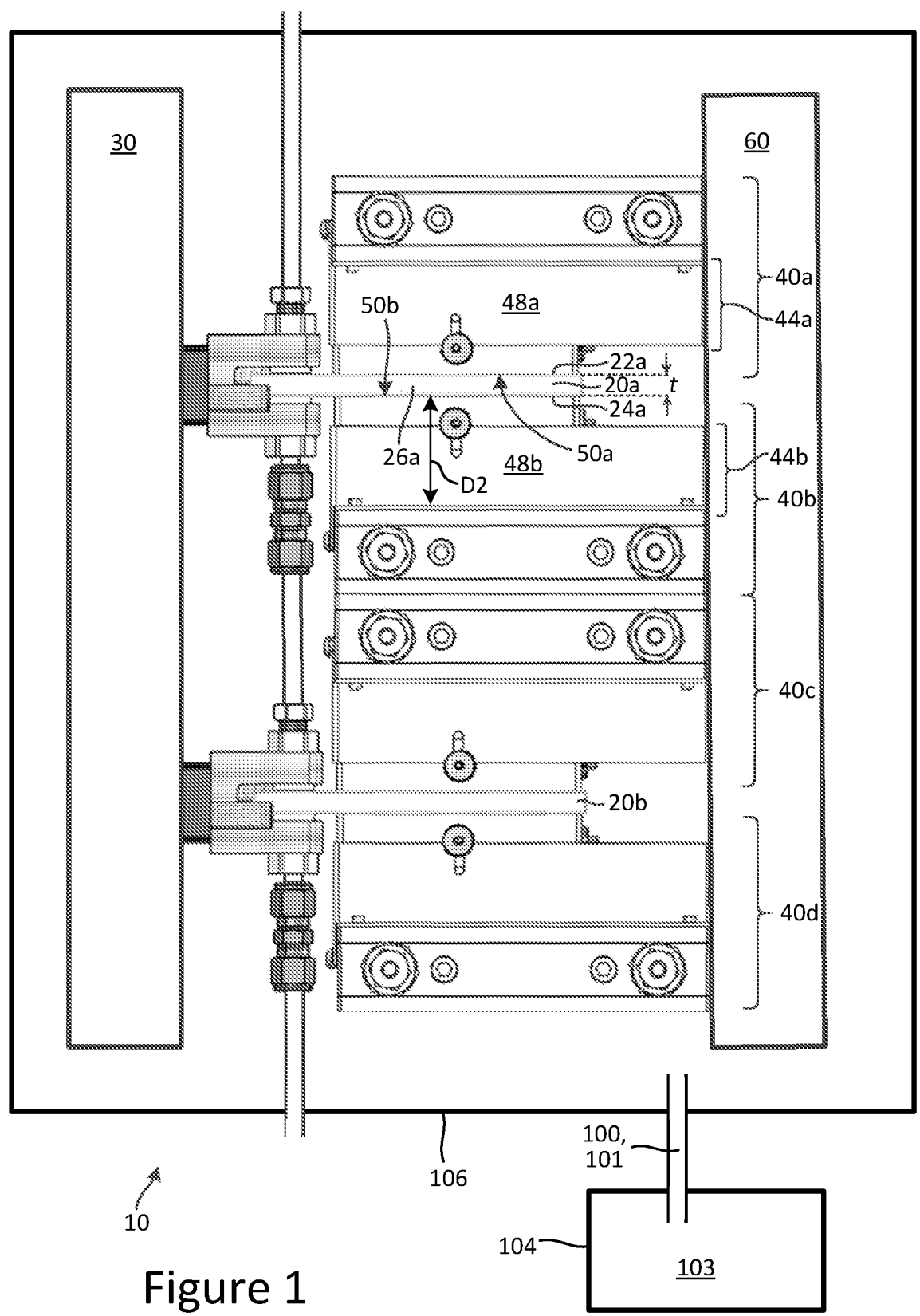
FIG. 1 is a partially schematic plan view of an embodiment of the present disclosure.

FIG. 1 is a partially schematic plan view of a flow reactor (10) comprising at least a first fluidic module (20a). The first fluidic module (20a) having first and second major outer surfaces (22a, 24a) of essentially planar form, on opposite sides of the module, the first and second major outer surfaces (22a, 24a) surrounded and connected by an edge surface (26a) of the module and separated by a thickness (t) of the module.

Figure 5:
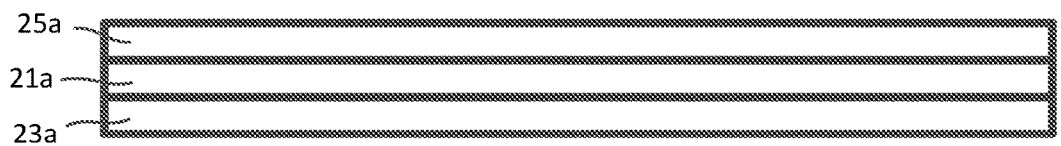
FIG. 5 is a schematic diagram illustrating certain aspects of the structure of a fluidic module useful in the embodiment of FIG. 1.

The first fluidic module (20a) has therein one or more fluid passages for flowing a process fluid. Desirably, the first fluidic module 20a comprises three layers as shown schematically in FIG. 5. A process fluid layer 21a is desirably positioned between first and second thermal control fluid layers 23a, 25a for best thermal control of relatively highly exothermic or endothermic reactions, for example. Only one or even no thermal control layers may be used in alternative embodiments, however.

Figure 6:
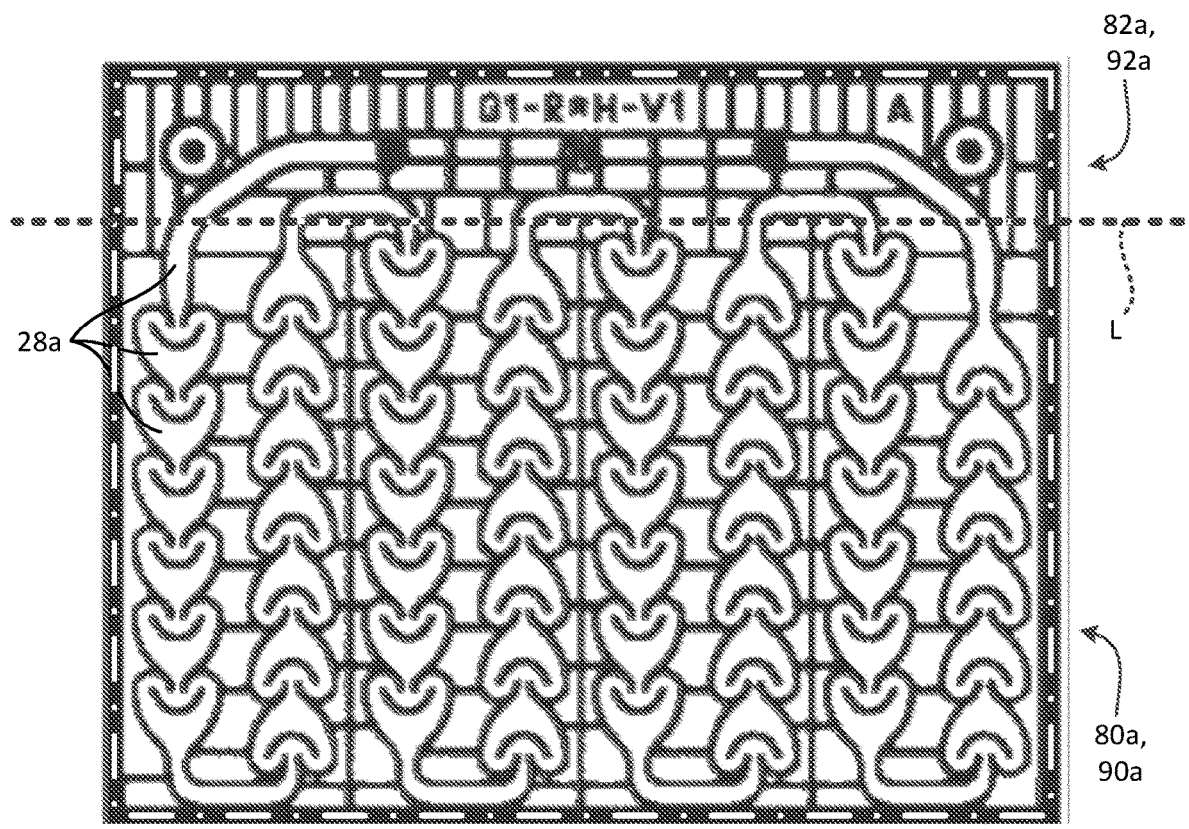
FIG. 6 is a plan view of certain fluid passages of a fluidic module useful in the embodiment of FIG. 1.

FIG. 6 shows a plan view of one or more fluid passages (28a) within the first fluidic module 20a, within the process fluid layer (21a).

The first fluidic module 20a is desirably formed completely or at least principally of glass, transparent ceramic or glass-ceramic, but may also be formed of other transmissive materials, such that the first fluidic module has a transmittance through the first major outer surface (22a) to at least one of the one or more fluid passages (28a) of at least 20% over at least some range of wavelengths, desirably over at least some range of wavelengths within the larger range of 300 to 800 nm.

Referring again to FIG. 1, the flow reactor (10) further comprises at least a first illumination module (40a). A perspective view of an embodiment of the first illumination module (40a) is shown in FIG. 2.

Figure 2:
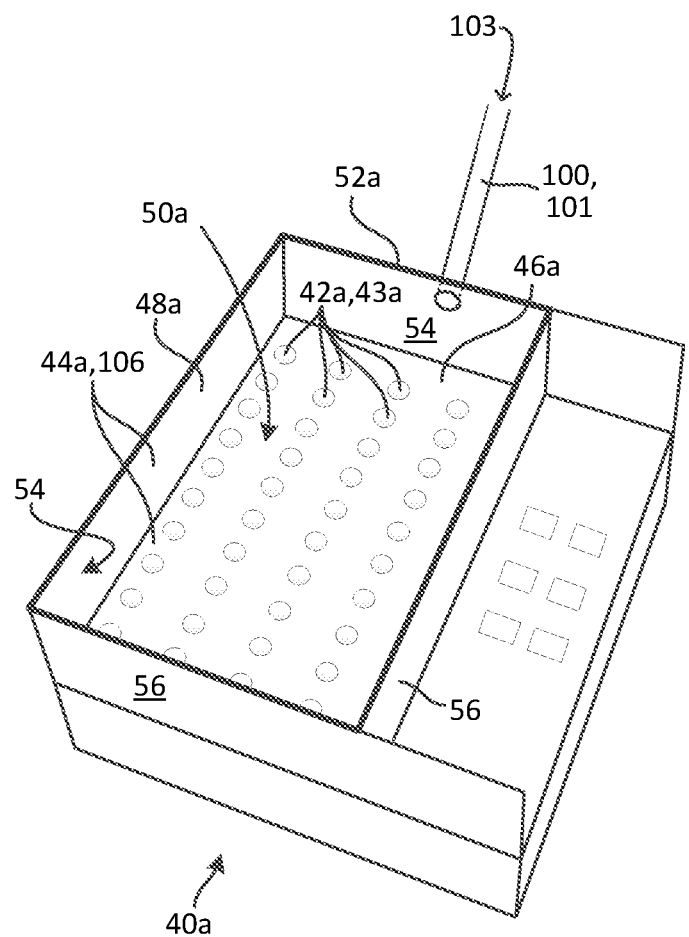
FIG. 2 is perspective view of certain elements of an illumination module of the embodiment of FIG. 1.

With reference to FIG. 2, the first illumination module (40a) comprises one or more radiation sources (42a) which emit, at least in part, within the range of wavelengths mentioned above, so as to be able to transmit radiation into the one or more fluid passages (28a). The one or more radiation sources (42a) desirably take the form of a plurality of semiconductor emitters (43a).

The one or more radiation sources (42a) or the plurality of semiconductor emitters (43a) is positioned within an enclosure (44a) comprising a back wall (46a) and a side wall (48a) extending from the back wall (46a). The side wall (48a) extends from the back wall (46a) of the enclosure (44a) in a direction non-parallel to the back wall (46a) of the enclosure. In some embodiments as in the embodiment shown in FIG. 2, the back wall (46a) is generally planar. Also in some embodiments, and as in the embodiment shown in FIG. 2, the side wall (48a) extends from the back wall (46a) in a direction essentially perpendicular to the back wall (46a). The enclosure (44a) has an opening (50a) opposite the back wall (46a). An edge (52a) (shown as a heavier black line in FIG. 2) of the side wall (48a) opposite the back wall (46a) surrounds the opening (50a). The edge (52a) lies essentially in a single plane.

Referring again to FIG. 1, the first illumination module (40*a*) is positioned such that the opening (50*a*) of the first illumination module (40*a*) faces the first major outer surface (22*a*) of the first fluidic module (20*a*).

Figure 3:
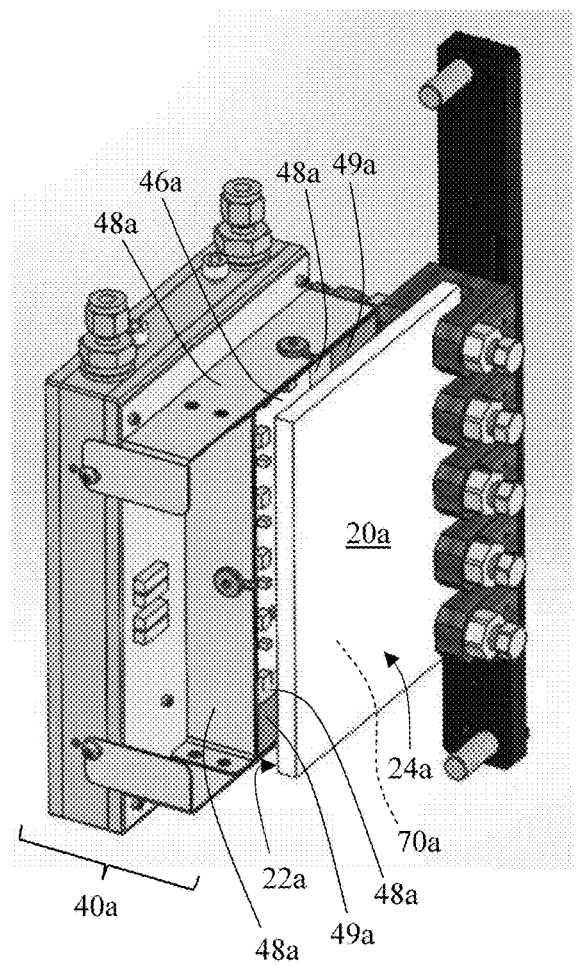
FIGS. 3 and 4 are perspective views of an illumination module of the embodiment of FIG. 1 together with a fluidic module of the embodiment of FIG. 1.
Figure 4:
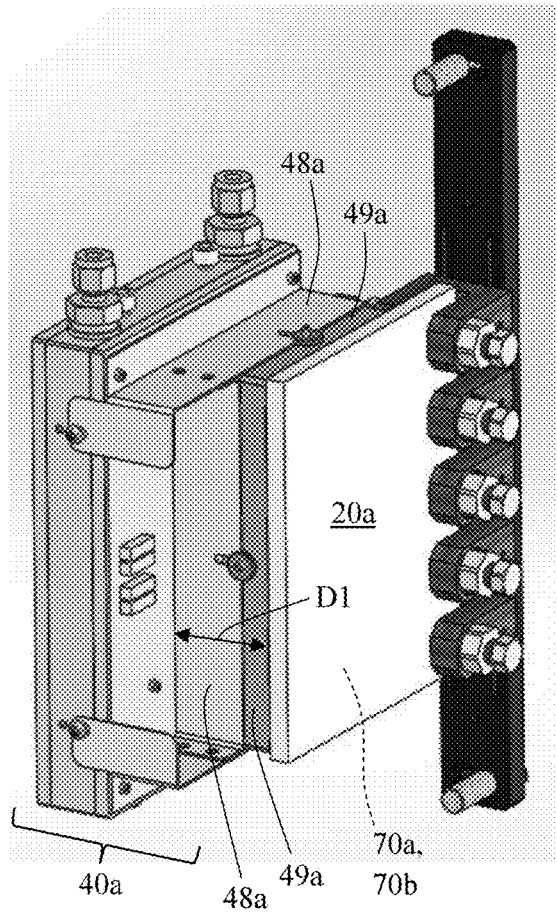

As shown in FIGS. 1, 3, and 4, the side wall (48*a*) of the first illumination module (40*a*) comprises a telescoping portion (49*a*) such that a distance (D1) from the back wall (46*a*) of the enclosure (44*a*) to the single plane of the edge (52*a*) of the side wall (48*a*) surrounding the opening (50*a*) is adjustable. The telescoping portion (49*a*) in embodiments is configured as a second side wall moveably nested with the side wall (48*a*) as shown in FIGS. 3 and 4. This configuration allows for a lower level of stray radiation and can also allow for easy assembly together of several illumination modules and several fluidic modules simultaneously, without danger of scratching the surfaces of the fluidic modules, thereby marring the transmissive qualities of the surfaces and possibly weakening the fluidic modules. In some embodiments which are presently preferred, the distance (D1) from the back wall (46*a*) of the enclosure (44*a*) to the single plane of the edge (52*a*) of the side wall (48*a*) surrounding the opening (50*a*), of the first illumination module (20*a*), is sufficiently adjustable to bring the edge (52*a*) of the side wall (48*a*) of the first illumination module (20*a*) into contact with the first major outer surface (22*a*) of the first fluidic module (20*a*), as seen in FIGS. 1 and 4.

In one alternative embodiment, the flow reactor (10) according to any of the above description can further comprise a first reflector (70*a*), shown in FIGS. 3 and 4, positioned on (as shown), or merely facing, the second major outer surface (24*a*) of the first fluidic module (20*a*) so as to reflect such radiation as may pass outward through the second major outer surface (24*a*) of the first fluidic module (20*a*) back toward the second major outer surface (24*a*) of the first fluidic module (20*a*). (Reflector 70*a* is indicated by a dashed line in FIGS. 3 and 4 to emphasize its optional nature.) In embodiments where reflectors are used, the flow reactor (10) can comprise at least a second fluidic module (20*b*) and a second illumination module (40*c*) and a second reflector (70*b*) (as when the structures of FIGS. 3 and 4 are used together in a single flow reactor (10).

Rather than a reflector 70*a* on or facing the second major outer surface (24*a*), the flow reactor (10) as seen in FIG. 1 desirably further comprises at least a second illumination module (40*b*) with the second illumination module (40*b*) positioned such that an opening (50*b*) of the second illumination module (40*b*) faces the second major outer surface (24*a*) of the first fluidic module (20*a*). Just as with the first illumination module (40*a*), so with the second (40*b*): a distance (D2) (shown on FIG. 1 in this case) from a back wall (46*b*) of an enclosure (44*b*) of the second illumination module (40*b*) to a plane containing an edge (52*b*) of a side wall (48*b*) of the second illumination module (40*b*) is sufficiently adjustable to bring the edge (52*b*) of the side wall (48*b*) of the second illumination module (40*b*) into contact with the second major outer surface (24*a*) of the first fluidic module (20*a*).

As further shown in FIG. 1, the flow reactor can further comprise at least a second fluidic module (20*b*) and at least third and fourth illumination modules (40*c*, 40*d*).

As an additional variation, in the flow reactor (10) according to any of the above descriptions and alternatives, the first and second fluidic modules (20*a*, 20*b*) can be supported on a first mounting structure (30) and the first, second, third, and fourth illumination modules (40*a*, 40*b*, 40*c*, 40*d*) can be supported on a second mounting structure (60), each shown schematically in FIG. 1. In a presently preferred alternative embodiment, at least one of the first and second mounting structures (30, 60) is moveable relative to the other, so as to simultaneously position the first fluidic module (20*a*) between the first and second illumination modules (40*a*, 40*b*) and the second fluidic module (20*b*) between the third and fourth illumination modules (40*c*, 40*d*). This allows easy mounting and positioned of the fluid modules and the illumination modules while they are not interleaved, while also allowing simultaneous interleaving of the mounted fluidic and illumination modules.

According to one presently preferred alternative embodiment, the range of wavelengths to which the first fluidic module is transmissive as described above is the range from 340 to 600 nm.

According to another presently preferred alternative embodiment also shown in FIG. 1, the flow reactor (10) according to any of the above described variations or alternatives further comprises a gas delivery structure (100) for providing a dry or relatively dry gas or gas mixture (103) to at least a gas-containing volume bordered by at least a portion of the first major outer surface (22*a*) of the first fluidic module (20*a*) so as to be able to prevent or reduce attenuation or blocking of radiation from the first illumination module, by condensation and/or deposition on the first major outer surface (22*a*) during operation of the first fluidic module (20*a*) at low temperatures. The gas delivery structure (100) may be in the form of a conduit (101) leading to the reactor (10) from a gas source (104). The reactor (10) may include an enclosure (106) to facilitate delivery of the dry or relatively dry gas or gas mixture. The enclosure (106) for enclosing or containing the gas or gas mixture (103) may enclose all modules of the reactor (10) as shown in FIG. 1, or the enclosure (106) may be formed by the individual enclosures (44*a*) as show in FIG. 2.

According to another presently preferred alternative embodiment, useful with any of the above described variations, the sidewall (48*a*) of the first illumination module (40*a*) has an exterior and an interior surface (54, 56) as indicated in FIG. 2, and the interior surface (54) has at least 80%, desirably at least 90%, reflectivity of one or more wavelengths within the range of wavelengths to which the first fluidic module (20*a*) is transmissive.

According to another presently preferred alternative embodiment, useful with any of the above described variations, the first fluidic module (20*a*), illustrated in FIG. 6, viewed from the first major outer surface (22*a*) thereof, has a first area (80*a*) on the first major outer surface (22*a*) overlying an interior volume (90*a*) of the module (20*a*) containing a relatively dense packing of the one or more fluid passages (28*a*) for flowing a process fluid (the area (80*a*) and the interior volume (90*a*) are represented by the area of FIG. 6 bounded by the white dash-dot border and the dashed line L—below line L in the figure) and a second area (82*a*) overlying an interior volume (92*a*) of the module (20*a*) having none, or a relatively spaced-apart arrangement, of the one or more fluid passages (28*a*) for flowing a process fluid (the area (82*a*) and the interior volume (92*a*) are represented by the area of FIG. 6 bounded by the white dash-dot-dot border and the dashed line L—above line L in the figure) and wherein the opening of the first illumination module (40*a*) has a shape corresponding to a perimeter of the first area (the area (80*a*). This allows the radiation from the first illumination module (40*a*) to be directed to the area and volume of the first fluidic module (20*a*) where it will have the most beneficial effect.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, and desirably includes a chemical, physical, or biological process or reaction favored in the presence of light, of whatever wavelength, i.e., photoreactions, whether photosensitized, photoinitiated (as in photoinitiated radical reactions), photoactivated, photocatalytic, photosynthetic, or other). A non-limiting list of light-assisted or light-favored reactions of potential interest includes photoisomerizations, rearrangements, photoreductions, cyclizations, 2+2 cycloadditions, 4+2 cycloadditions, 4+4 cycloadditions, 1,3-dipolar cycloadditions, sigmatropic shifts (which could result in cyclisation), photooxidation, photocleavage of protecting groups or linkers, photohalogenations (phtochlorinations, photobrominations), photosulfochlorinations, photosulfoxidations, photopolymerizations, photonitrosations, photodecarboxylations, photosynthesis of previtamin D, decomposition of azo-compounds, Norrish type reactions, Barton type reactions. Further, the following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

The foregoing description provides exemplary embodiments to facilitate an understanding of the nature and character of the claims. It will be apparent to those skilled in the art that various modifications to these embodiments can be made without departing from the spirit and scope of the appending claims.

What is claimed is:

1. A flow reactor (10), the reactor comprising:
   at least a first fluidic module (20a), the first fluidic module (20a) having a planar form and defining first and second major outer surfaces (22a, 24a) on opposite sides of the first fluidic module, the first and second major outer surfaces (22a, 24a) surrounded and connected by an edge surface (26a) of the first fluidic module and separated by a thickness (t) of the first fluidic module, the first fluidic module (20a) having therein one or more fluid passages (28a) for flowing a process fluid, the first fluidic module having a transmittance through the first major outer surface (22a) to at least one of the one or more fluid passages (28a) of at least 20% over a range of wavelengths;
   at least a first illumination module (40a), the first illumination module (40a) comprising one or more radiation sources (42a) which emit, at least in part, within the range of wavelengths, positioned within an enclosure (44a), the enclosure (44a) comprising a back wall (46a) and a side wall (48a) extending from the back wall (46a) of the enclosure (44a) in a direction non-parallel to the back wall (46a) of the enclosure, the enclosure (44a) having an opening (50a) opposite the back wall (46a), an edge (52a) of the side wall (48a) opposite the back wall (46a) surrounding the opening (50a), the edge (52a) lying in a single plane, the first illumination module (40a) positioned such that the opening (50a) of the first illumination module (40a) faces the first major outer surface (22a) of the first fluidic module (20a);
   wherein the side wall (48a) of the first illumination module (40a) comprises a telescoping portion (49a) that is moveably nested with the side wall such that a distance (D1) from the back wall (46a) of the enclosure (44a) to the single plane of the edge (52a) of the side wall (48a) surrounding the opening (50a) is adjustable.

2. The flow reactor (10) according to claim 1 wherein the one or more radiation sources (42a) comprise one or more semiconductor emitters (43a).

3. The flow reactor (10) according to claim 1 wherein the back wall (46a) of the enclosure (44a) is planar and the side wall (48a) of the enclosure (44a) extends from the back wall (46a) in a direction perpendicular to the back wall (46a).

4. The flow reactor (10) according to claim 1 wherein the distance (D1) from the back wall (46a) of the enclosure (44a) to the single plane of the edge (52a) of the side wall (48a) surrounding the opening (50a), all of the first illumination module (20a), is adjustable to bring the edge (52a) of the side wall (48a) of the first illumination module (20a) into contact with the first major outer surface (22a) of the first fluidic module (20a).

5. The flow reactor (10) according to claim 1, further comprising a first reflector (70a), positioned on, or facing, the second major outer surface (24a) of the first fluidic module (20a) so as to reflect such radiation as may pass outward through the second major outer surface (24a) of the first fluidic module (20a) back toward the second major outer surface (24a) of the first fluidic module (20a).

6. The flow reactor (10) according to claim 5 further comprising a second fluidic module (20b) and a second illumination module (40c) and a second reflector (70b).

7. The flow reactor (10) according claim 1, further comprising at least a second illumination module (40b) positioned such that an opening (50b) of the second illumination module (40b) faces the second major outer surface (24a) of the first fluidic module (20a).

8. The flow reactor (10) according to claim 7 wherein a distance (D2) from a back wall (46b) of an enclosure (44b) of the second illumination module (40b) to a plane containing an edge (52b) of a side wall (48b) of the second illumination module (40b) is adjustable to bring the edge (52b) of the side wall (48b) of the second illumination module (40b) into contact with the second major outer surface (24a) of the first fluidic module (20a).

9. The flow reactor (10) according to claim 7 further comprising a second fluidic module (20b) and third and fourth illumination modules (40c, 40d).

10. The flow reactor (10) according to claim 9 wherein the first and second fluidic modules (20a, 20b) are supported on a first mounting structure (30) and the first, second, third, and fourth illumination modules (40a, 40b, 40c, 40d) are supported on a second mounting structure (60) and wherein at least one of the first and second mounting structures (30, 60) is moveable relative to the other so as to simultaneously position the first fluidic module (20*a*) between the first and second illumination modules (40*a*, 40*b*) and the second fluidic module (20*b*) between the third and fourth illumination modules (40*c*, 40*d*).

11. The flow reactor (10) according to claim 1 wherein the range of wavelengths comprises the range from 340 to 600 nm.

12. The flow reactor (10) according to claim 1 further comprising a gas delivery structure (100) for providing a gas or gas mixture (103) to at least a gas-containing volume (106) bordered by at least a portion of the first major outer surface (22*a*) of the first fluidic module (20*a*), the gas having a dryness configured to prevent or reduce attenuation or blocking of radiation from the first illumination module, by condensation and/or deposition on the first major outer surface (22*a*), during operation of the first fluidic module (20*a*) at low temperatures.

13. The flow reactor (10) according to claim 12 wherein the gas-containing volume (106) is formed by the enclosure (44*a*).

14. The flow reactor (10) according to claim 1 wherein the sidewall (48*a*) of the first illumination module (40*a*) has an exterior and an interior surface (54, 56), and the interior surface (54) has at least 80% reflectivity of one or more wavelengths within the range of wavelengths.

15. The flow reactor (10) according to claim 1 wherein the sidewall (48*a*) of the first illumination module (40*a*) has an exterior and an interior surface (54, 56), and the interior surface (56) has at least 90% reflectivity of one or more wavelengths within the range of wavelengths.

16. The flow reactor (10) according to claim 1 wherein the first fluidic module (20*a*), viewed from the first major outer surface (22*a*) thereof, has a first area (80*a*) on the first major outer surface (22*a*) overlying an interior volume (90*a*) of the first fluidic module (20*a*) containing a first arrangement of the one or more fluid passages (28*a*) and a second area (82*a*) overlying an interior volume (92*a*) of the first fluidic module (20*a*) containing none of the one or more fluid passages or containing a second arrangement of the one or more fluid passages (28*a*) that is less densely packed than the first arrangement, and wherein the opening of the first illumination module (40*a*) has a shape corresponding to a perimeter of the first area.

17. The flow reactor (10) according to claim 1, wherein the telescoping portion defines a second side wall that extends in the direction non-parallel to the back wall of the enclosure.

18. The flow reactor (10) according to claim 1, wherein the telescoping portion is moveable from a retracted position in which the side wall defines the edge to an extended position in which the telescoping portion defines the edge.

\* \* \* \* \*

UNITED STATES PATENT AND TRADEMARK OFFICE
CERTIFICATE OF CORRECTION

| | |
|---|---|
| PATENT NO. | : 11,369,938 B2 |
| APPLICATION NO. | : 16/491041 |
| DATED | : June 28, 2022 |
| INVENTOR(S) | : Fouad El Jami et al. |

It is certified that error appears in the above-identified patent and that said Letters Patent is hereby corrected as shown below:

In the Claims

In Column 6, Line 47, in Claim 7, delete "according claim 1," and insert -- according to claim 1, --.

Signed and Sealed this
Eleventh Day of October, 2022

Katherine Kelly Vidal
*Director of the United States Patent and Trademark Office*